June 22, 1937.     J. N. GOOD     2,084,679
FLUID PRESSURE BRAKE
Filed Oct. 14, 1936     2 Sheets-Sheet 1

INVENTOR
JOHN N. GOOD
BY Wm. M. Cady
ATTORNEY

June 22, 1937.　　　　　J. N. GOOD　　　　　2,084,679
FLUID PRESSURE BRAKE
Filed Oct. 14, 1936　　　　2 Sheets-Sheet 2

INVENTOR
JOHN N. GOOD
BY *Wm. M. Cady*
ATTORNEY

Patented June 22, 1937

2,084,679

UNITED STATES PATENT OFFICE 2,084,679

FLUID PRESSURE BRAKE

John N. Good, Wilmerding, Pa., assignor to The Westinghouse Air Brake Company, Wilmerding, Pa., a corporation of Pennsylvania Application October 14, 1936, Serial No. 105,449

15 Claims. (Cl. 303—40)

This invention relates to fluid pressure brakes and more particularly to locomotive brake equipment of the type shown in U. S. Patent No. 2,009,840, issued July 30, 1935, to C. C .Farmer and E. E. Hewitt, and in U. S. Patent No. 2,009,841, issued July 30, 1935, to E. E. Hewitt.

The brake equipment shown in the above identified patents employs a distributing valve device having an equalizing portion which employs a piston subject to the opposing pressures of the fluid in the brake pipe and of the fluid in a pressure chamber. A reduction chamber is also provided and on a service reduction in brake pipe pressure the slide valve of the equalizing portion is moved to a position to establish communication between the pressure chamber and a passage through which fluid under pressure may be supplied to the reduction chamber.

This distributing valve device also has associated therewith a reduction chamber cut-off valve device, and on an increase in the pressure of the fluid supplied to the reduction chamber to a predetermined value this valve device moves from its normal position to an application position to cut off the supply of fluid to the reduction chamber, and to establish a communication through which fluid under pressure may be supplied from the pressure chamber to the application portion of the distributing valve device to effect operation of this portion to supply fluid under pressure to the brake cylinder and thereby effect an application of the brakes.

The reduction chamber cut-off valve device employs a piston subject to the opposing pressures of a spring and of the fluid in a valve chamber at the face thereof, and on movement of the piston to the application position to cut off the supply of fluid to the reduction chamber a passage is opened to connect the valve chamber at the face of the piston to the pressure chamber, while the piston remains subject to the force of the spring.

There is a possibility that the pressure of the fluid in the valve chamber at the face of the piston of the reduction chamber cut-off valve device will reduce to a value insufficient to maintain this piston in its application position against the opposing force of the spring, and that the piston will thereupon be returned to its normal position, thereby interfering with the intended operation of the brake equipment.

It is an object of this invention to provide an improved locomotive brake equipment of the type described and having means operative on movement of the reduction chamber cut-off valve device to its application position to relieve the piston of force exerted by the spring associated therewith, and thereby eliminates the possibility of an unintended return of this piston to its normal position.

A further object of the invention is to provide an improved locomotive brake equipment of the type described and incorporating means operative on movement of the piston of the reduction chamber cut-off valve device away from its normal position to render the spring associated therewith ineffective to exert force on the said piston.

Another object of the invention is to provide an improved locomotive brake equipment.

Other objects of the invention and features of novelty will be apparent from the following description taken in connection with the accompanying drawings, in which.

Figure 1:
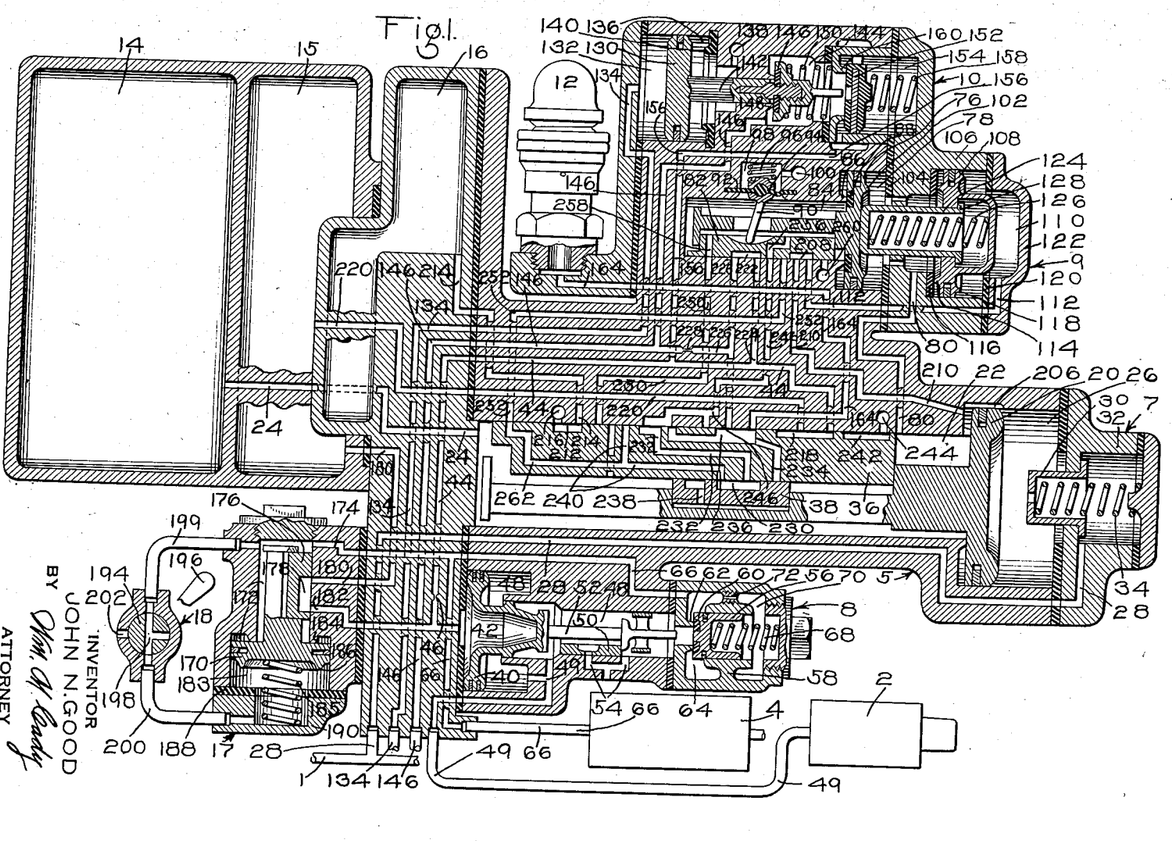
Fig. 1 is a view, largely in section, of a portion of a locomotive brake equipment embodying my invention.

Referring to Fig. 1 of the drawings, the brake equipment shown therein comprises a brake pipe 1, a brake cylinder 2, a reservoir 4, and a distributing valve device indicated generally by the reference numeral 5.

The brake equipment is similar to that shown in the above identified patents, and only such portions of the brake equipment are shown herein as are essential to the understanding of this invention.

The distributing valve device 5 comprises an equalizing portion 7, an application portion 8, a release valve 10, a safety valve 12, a pressure chamber 14, an application chamber 15, a reduction chamber 16, a delay valve 17, and a delay control valve device 18.

The equalizing portion 7 of the distributing valve device 5 comprises a piston 20 mounted in a bore in the body of the distributing valve device. The piston 20 has at one side thereof a valve chamber 22 which is constantly connected by way of a passage 24 with the pressure chamber 14. The piston 20 has at the other side thereof a chamber 26 which is constantly connected by way of a passage and pipe 28 with the brake pipe 1.

A plunger 30 is slidably mounted in a bore in a cover section 32 and is yieldingly urged to the left, as viewed in the drawings, by means of a spring 34. The end of the plunger 30 is adapted to be engaged by the face of the piston 20 to yieldingly oppose movement of the piston 20 to the right after a predetermined amount of movement of the piston in this direction from its release position.

The piston 20 has a stem formed integral therewith which operates a main slide valve 36 which is mounted in the valve chamber 22 and is slidable upon a seat formed on the body of the distributing valve device 5. This stem also operates an auxiliary slide valve 38 having movement relative to the main slide valve 36.

The application portion 8 of the distributing valve device 5 comprises a piston 40 mounted in a bore in the body of the distributing valve device and having at one side thereof a chamber 42, which is connected by way of a passage 44 with a port in the seat of the main slide valve 36 of the equalizing portion 7. The passage 44 has a choke or restricted portion 46 interposed therein.

The piston 40 has at the other side thereof a valve chamber 48 which is constantly connected with the brake cylinder 4 by way of a passage and pipe 49, and has mounted therein a slide valve 50 which is operated by means of a stem 52 formed integral with the piston 40. The slide valve 50 controls communication between the valve chamber 48 and the atmosphere through passages 54.

The end of the stem 52 is adapted to engage the face of a valve piston 56 which is slidably mounted in a bore in a wall 58. The valve piston 56 has a sealing gasket 60 secured on the face thereof, and this sealing gasket is adapted to engage the seat rib 62 surrounding a passage which communicates with the valve chamber 48 and with a chamber 64 which is constantly connected by way of a passage and pipe 66 with the main reservoir 4, which may be supplied with fluid under pressure by any suitable means, not shown.

The valve piston 56 is yieldingly urged to the left, as viewed in the drawings, by means of a spring 68, while the chamber 70 at the spring side of the valve piston 56 is connected with the chamber 64 by way of a restricted passage 72.

The reduction chamber cut-off valve device 9 comprises a piston 76 reciprocable in a bore in the body of the distributing valve device 5, and having at one side thereof an operating chamber 78 which is constantly connected by way of a passage 80 with a port in the seat of the main slide valve 36 of the equalizing portion 7.

The piston 76 has a stem formed integral therewith which is adapted to operate a slide valve 82 mounted in a valve chamber 84. The valve chamber 84 is open at one end and this end of the valve chamber is surrounded by a seat rib 86 of substantially smaller diameter than the piston 76, and this seat rib is adapted to be engaged by a sealing gasket 88 secured on the face of the piston 76.

The slide valve 82 is held against its seat by means of a strut 90 which engages one face of the slide valve and which also engages one face of a diaphragm 92. The other face of the diaphragm 92 is engaged by a spring seat 94, while a spring 96 extends between the spring seat 94 and the body of the distributing valve device 5 and operates through the diaphragm 92 to press the strut 90 against the slide valve 82. The spring 96 is mounted in a chamber 98, which is constantly connected to the atmosphere by way of a passage 100.

The piston 76 has an annular seat rib 102 formed on the face thereof which is adapted to engage a face of the gasket 104, which is clamped between the body of the distributing valve device 5 and a cover section 106.

The reduction chamber cut-off valve device 9 includes a movable abutment in the form of a piston 108 which is reciprocable in a bore in the cover section 106, and which is subject on one face to the pressure of the fluid in the operating chamber 78 and is subject on the other face to the pressure of the fluid in a control chamber 110, which is constantly connected by way of a passage 112 with a port in the seat of the slide valve 82 of the reduction chamber cut-off valve device.

The piston 108 has formed on one face thereof an annular seat rib 114 which is adapted to engage a sealing gasket 116 positioned in the cover section 106 at the end of the bore in which the piston 108 is mounted.

The piston 108 has formed on the other face thereof an annular seat rib 118 which is adapted to engage the face of a gasket 120 which is clamped between the cover section 106 and a cover plate 122.

The piston 108 has a bore therein in which is mounted a plunger 124 which is yieldingly urged to the left, as viewed in the drawings, by means of a spring 126. The plunger 124 has a flange 128 thereon which serves to limit movement of the plunger by the spring. The end of the plunger 124 is adapted to engage the face of the piston 76 to yieldingly resist movement of the piston 76 to the right at certain times, as will hereinafter more fully appear.

The release valve 10 comprises a movable abutment in the form of a piston 130 mounted in a bore in the body of the distributing valve device 5, and having at one side thereof a chamber 132 which is constantly connected by way of the independent release passage and pipe 134 with a port in the seat of the rotary valve of the independent portion of the engineer's brake valve device, not shown.

The piston 130 has at the other face thereof a chamber 136 which is constantly connected to the atmosphere by way of a port 138, while a gasket having an annular seat rib 140 thereon is secured in the body of the distributing valve device 5 adjacent the end of the bore in which the piston 130 is mounted and the seat rib 140 is adapted to be engaged by the face of the piston 130.

The piston 130 has a stem 142 formed integral therewith which extends through an opening in the wall of a chamber 144, which is constantly connected by way of the independent application passage and pipe 146 with a port in the seat of the rotary valve of the independent portion of the engineer's brake valve device, not shown.

The stem 142 has a valve 146 secured thereon and carrying a sealing gasket which is adapted to engage a seat rib 148 surrounding the opening in which the stem 142 is mounted to cut off communication between the chamber 144 and the atmosphere through this opening in one position of the piston 130. A spring 150 is provided and yieldingly urges the valve 146 and the piston 130 to the left, as viewed in the drawings, so that the valve engages the seat rib 148.

The end of the stem 142 is adapted to engage the face of a valve 152 which is mounted in a chamber 154, which is constantly connected by way of a passage 156 with the passage 44, and thereby with the chamber 42 at the face of the piston 40 of the application portion 8.

The valve 152 is yieldingly urged by a spring 158 into engagement with a seat rib 160 surrounding a port communicating with the chamber 144.

The safety valve 12 may be of any suitable well known construction and operates to release fluid to the atmosphere on an increase in the pressure of the fluid supplied thereto to a predetermined value. The safety valve 12 communicates by way of a passage 164 with a port in the seat of the main slide valve 36 of the equalizing portion 7.

The delay valve device 17 comprises a body having a bore therein in which is mounted a piston 170 having at one side thereof a valve chamber 172, which is constantly connected by way of a passage 174 with the passage 66, and thereby with the main reservoir 4. The piston 170 has a stem formed integral therewith which is adapted to operate a slide valve 176 mounted in the valve chamber 172 and having a cavity 178 therein, which in one position of the piston 170 establishes communication between a passage 180, which communicates with the application chamber 15, and a passage 182 which communicates with the chamber 42 at the face of the piston 40 of the application portion 8.

The piston 170 has at the other face thereof a chamber 183 in which is mounted a spring 185 which yieldingly urges the piston upwardly, as viewed in the drawings, into engagement with a stop 184, while the face of the piston 170 has an annular seat rib 186 formed thereon which is adapted to engage a gasket 188 which is clamped between the body of the delay valve device and the cover section 190.

The delay control valve device 18 comprises a body having a bore therein in which is mounted a plug valve 194 which is adapted to be moved between spaced positions by means of a handle 196. The plug valve 194 has a branched passage 198 formed therein which in one position of the plug valve establishes communication between a pipe 199 leading from the valve chamber 172, and a pipe 200 leading to the chamber 183 at the other face of the piston 170. In the other position of the plug valve 194 the port 198 establishes communication between the pipe 200 and the atmosphere through a port 202, while it cuts off communication between the pipe 199 and the pipe 200.

The distributing valve device 5 is shown in Fig. 1 of the drawings with the equalizing portion in the release position, the application portion in its release position, the reduction chamber cut-off valve device in the normal position, the release valve in a position to cut off the release of fluid from the application portion, and with the delay control valve device in the position to condition the delay valve to remain in the non-delay position.

It is assumed that at this time the independent portion of the engineer's brake valve device, not shown, is in its running position, in which the independent release pipe 134 is connected to the atmosphere, and in which position the application pipe 146 is connected to a port in the seat of the rotary valve of the automatic portion of the engineer's brake valve, not shown.

In initially charging the equipment the automatic portion of the engineer's brake valve is turned to its release position in which fluid under pressure is supplied from the main reservoir 4 to the brake pipe 1, and after a time interval the automatic portion of the engineer's brake valve device is turned to the running position in which fluid under pressure is supplied by a feed valve device, not shown, to the brake pipe 1 from the main reservoir at the pressure carried in the brake pipe. In the running position of the automatic portion of the engineer's brake valve device the application pipe 146 is connected to the atmosphere.

Fluid under pressure supplied to the brake pipe 1 flows therefrom through the branch pipe and passage 28 to the chamber 26 at the face of the piston 20 of the equalizing portion 7 and moves this piston to the left, as viewed in the drawings, to its release position, which is the position in which it is shown in Fig. 1 of the drawings. On movement of the piston 20 to the release position fluid under pressure flows from the chamber 26 through the feed groove 206 around the piston 20 to the valve chamber 22, from which it flows by way of the passage 24 to the pressure chamber 14 to charge this chamber with fluid under pressure at the pressure carried in the brake pipe 1.

On movement of the piston 20 to the release position the main slide valve 36 is moved to a position to open communication between the valve chamber 22 and the port 80 so that fluid under pressure is supplied from the valve chamber 22 through the port 80 to the operating chamber 78 to increase the pressure of the fluid in this chamber to the pressure of the fluid carried in the pressure chamber 14.

On an increase in the pressure of the fluid in the operating chamber 78 force is exerted on the piston 76 of the reduction chamber cut-off valve 9 to move this piston to the left, as viewed in the drawings, so that the sealing gasket 88 engages the seat rib 86.

In this position of the piston 76 the slide valve 82 is held in a position in which a cavity 208 therein establishes communication between the passage 112 and a passage 210 communicating with the valve chamber 22 so that fluid under pressure may flow from the valve chamber 22 through the passage 210 and the cavity 208 to the passage 112, through which it flows to the control chamber 110 at the face of the piston 108 to charge this chamber to the pressure carried in the valve chamber 22.

At this time the piston 108 is subject to the opposing pressures of the fluid in the operating chamber 78 and of the fluid in the control chamber 110, and as these chambers are both charged with fluid under pressure supplied from the valve chamber 22, they will be at substantially the same pressure and hence no force will be exerted on the piston 108 at this time tending to move it in either direction. The piston 108, therefore, will remain in the position which it occupies, which may be at any point throughout its range of movement.

In the release position of the piston 20 of the equalizing portion 7 of the distributing valve device 5 a cavity 212 in the main slide valve 36 establishes communication between a passage 214 leading from the reduction chamber 16, and an atmospheric passage 216, while a cavity 218 in the main slide valve 36 establishes communication between a passage 220 leading from the application chamber 15, and the passage 44 which communicates with the chamber 42 at the face of the piston 40 of the application portion 8.

In the normal position of the piston 76 of the reduction chamber cut-off valve, which is the position in which the piston is shown in Fig. 1 of the drawings, the slide valve 82 is held in a position in which a cavity 222 therein establishes communication between a passage 224, which leads from the passage 44, and a passage 226 which communicates with the application passage 146 through a choke 228. As the application passage is connected to the atmosphere through the automatic portion of the engineer's brake valve device, not shown, at this time, the application chamber 15 and the chamber 42 of the application portion 8 will be connected to atmosphere. In addition, the chambers 144 and 154 of the release valve 10 are connected to the atmosphere.

In order to effect a service application of the brakes, the automatic portion of the engineer's brake valve device is turned to the automatic service position in which fluid under pressure is released from the brake pipe 1 to reduce the pressure of the fluid therein at a service rate. In this position of the automatic portion of the engineer's brake valve communication between the application pipe and passage 146 and the atmosphere is cut off.

Figure 2:
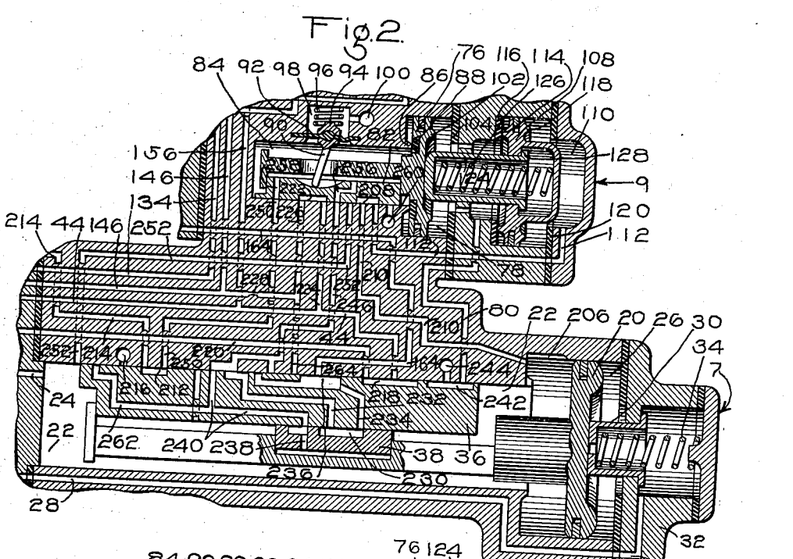
Fig. 2 is a fragmentary sectional view of a portion of the distributing valve shown in Fig. 1 of the drawings, the equalizing portion of the distributing valve being shown in the application position.
Figure 3:
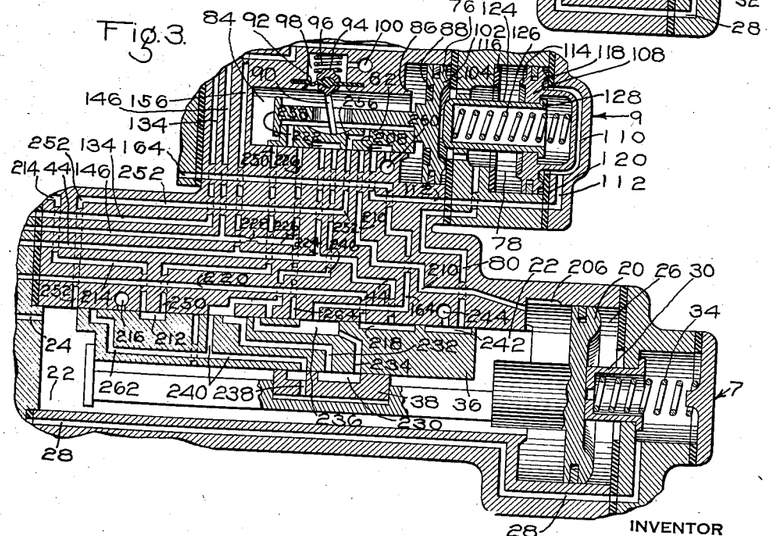
Fig. 3 is a view similar to Fig. 2, but showing the piston of the reduction chamber cut-off valve device in its application position.

On a reduction in brake pipe pressure at a service rate there is a reduction in the pressure of the fluid in the chamber 26 at the face of the piston 20 of the equalizing portion 7, and this piston is moved to the right, as viewed in the drawings, by the fluid under pressure in the valve chamber 22 and the pressure chamber 14 until further movement of the piston is opposed by the spring 34 acting through the plunger 30. This is the service application position of the equalizing portion of the distributing valve device 5, and is the position in which the piston 20 is shown in Figs. 2 and 3 of the drawings.

On initial movement of the piston 20 the auxiliary slide valve 38 is moved relative to the main slide valve 36 so that a cavity 230 in the auxiliary slide valve 38 establishes communication between a port 232 through the main slide valve 36, and a port 234 through the main slide valve 36 which communicates with a cavity 236 in the face of the main slide valve.

On further movement of the piston 20 to the right the main slide valve 36 is moved upon its seat to the application position. On movement of the main slide valve 36 to this position it cuts off the flow of fluid from the valve chamber 22 to the passage 80 leading to the operating chamber 78 intermediate the pistons 76 and 108 of the reduction chamber cut-off valve device 9, while a cavity 242 in the main slide valve 36 establishes communication between the passage 80 and an atmospheric passage 244 so as to release fluid from the operating chamber 78.

On this reduction in the pressure of the fluid in the chamber 78, the piston 108 is moved to the left by the fluid under pressure in the control chamber 110 until the seat rib 114 thereon engages the sealing gasket 116, if the piston is not already in this position. Fluid under pressure continues to be supplied from the valve chamber 22 to the control chamber 110 by way of the passage 210, cavity 208 in the slide valve 82 and the passage 112, so that the fluid under pressure in the control chamber 110 is effective to move the piston 108. As the seat rib 114 engages the sealing gasket 116 leakage of fluid from the chamber 110 past the piston 108 to the chamber 78 and thence to the atmosphere is prevented.

On movement of the piston 108 to the position in which the seat rib 114 engages the sealing gasket 116, which is the position in which it is shown in Figs. 1 and 2 of the drawings, the end of the plunger 124 is pressed against the face of the piston 76 so as to press the sealing gasket 88 firmly into engagement with the seat rib 86 surrounding the valve chamber 84.

In addition, in this position of the main slide valve 36 of the equalizing portion 7 the cavity 218 therein continues to establish communication between the passage 86, which communicates with the chamber 42 at the face of the piston 40 of the application portion 8, and the passage 220 which communicates with the application chamber 15.

In this position of the main slide valve 36 the cavity 212 therein is moved to a position to cut off communication between the passage 214 leading from the reduction chamber 16, and the atmospheric passage 216, and to establish communication between the passage 214 and a passage 250 leading from a port in the seat of the slide valve 82 of the reduction chamber cut-off valve device 9.

In the application position of the main slide valve 36 one end of a passage 252, which communicates with a port in the seat of the slide valve 82 of the reduction chamber cut-off valve device 9, is uncovered, but in this position of the slide valve 82, the other end of the passage 252 is blanked.

On movement of the main slide valve 36 of the equalizing portion 7 to the application position a port 240 therein communicates with a passage 246 leading to a port in the seat of the slide valve 82, so that fluid under pressure from the valve chamber 22 and the pressure chamber 14 may flow through the port 238 through the auxiliary slide valve 38 to the port 240 in the main slide valve 36, and thence to the passage 246. In this position of the slide valve 82 of the reduction chamber cut-off valve device 9, the passage 246 communicates with a port 256 through the slide valve 82 so that fluid under pressure flows to the valve chamber 84 to increase the pressure of the fluid therein, while fluid under pressure supplied to the valve chamber 84 flows therefrom through a port 258 through the slide valve 82, and in this position of the slide valve 82 the port 258 communicates with the passage 250 leading to a port in the seat of the main slide valve 36 so that fluid may flow through the cavity 212 to the passage 214, and thence to the reduction chamber 16 to increase the pressure of the fluid in this chamber.

When the pressure of the fluid in the valve chamber 84 and in the reduction chamber 16 has increased to a predetermined value, the force exerted by this fluid on the face of the piston 76 within the seat rib 86 is sufficient to overcome the opposing force of the spring 126 acting through the plunger 124, with the result that the piston 76 is moved to the right, as viewed in Figs. 1 and 2 of the drawings, away from the seat rib 86, thereby exposing the entire face of the piston to fluid under pressure in the valve chamber 84.

On movement of the piston 76 away from the seat rib 86 there is a substantial increase in the area of the piston subject to fluid under pressure, and a corresponding increase in the force exerted on the piston, with the result that the piston will thereafter be rapidly moved to the right to its operating position in which the seat rib 102 engages the face of the gasket 104 to prevent flow of fluid from the valve chamber 84 around the piston 76 to the operating chamber 78, from which it could escape to the atmosphere by way of the passage 80, the cavity 242 in the main slide valve 36 of the equalizing portion 7, and the atmospheric passage 244.

On movement of the piston 76 to its operating position, the slide valve 82 of the reduction chamber cut-off valve device 9 is moved to a position in which the cavity 208 therein no longer establishes communication between the passage 210 leading from the valve chamber 22, and the passage 112 leading to the control chamber 110, so that the supply of fluid under pressure to the control chamber from the valve chamber 22 and the pressure chamber 14 is cut off.

In this position of the slide valve 82 the cavity 208 therein establishes communication between the passage 112 and an atmospheric passage 260 so that the fluid under pressure present in the control chamber 110 is released to the atmosphere.

On this reduction in the pressure of the fluid in the control chamber 110 the piston 108 is no longer effective to hold the spring 126 in a position to press the end of the plunger 124 against the face of the piston 76, while the spring 126 will expand and move the piston 108 to the right, as viewed in the drawings, until the flange 128 on the plunger 124 engages the piston 108 to prevent further expansion of the spring 126.

The piston 108 is now substantially in the position in which it is shown in Fig. 3 of the drawings, while the spring 126 is ineffective to exert force on the piston 76 tending to move it to the left, as viewed in the drawings, against the opposing force of the fluid under pressure in the valve chamber 84 at the opposite face of the piston 76. As a result, therefore, there is no possibility of unintended movement of the piston 76 of the reduction chamber cut-off valve device to its normal position after movement thereof to the application position.

On movement of the slide valve 82 to the application position the port 256 therethrough is moved out of communication with the passage 246, and into communication with the passage 252, so that fluid under pressure may flow from the valve chamber 22 and the pressure chamber 14 through the passage 252 and thence through the port 256 through the slide valve 82 to the valve chamber 84 to increase the pressure of the fluid in this chamber substantially to the pressure in the valve chamber 22.

In addition, when the slide valve 82 is moved to the application position, the port 258 therethrough is moved out of alignment with the passage 250, while the slide valve cuts off communication between the valve chamber 84 and the passage 250 to thereby cut off the supply of fluid from the pressure chamber 14 and the valve chamber 22 to the reduction chamber 16.

In this position of the slide valve 82 the cavity 222 therein no longer establishes communication between the passage 226 leading from the application pipe 146, and the passage 224 leading to the passage 44, but is in a position to establish communication between the passage 224 and the passage 246, with the result that fluid under pressure supplied from the valve chamber 22 through the port 236 through the auxiliary slide valve 38, to the port 240 through the main slide valve 36, and thence to the passage 246 may flow therefrom to the passage 224 to the passage 44. Fluid under pressure supplied to the passage 44 flows in one direction therethrough to the cavity 218 in the face of the main slide valve 36 and thence to the passage 220 leading to the application chamber 15, from which it may flow by way of the passage 180 and the cavity 178 in the slide valve 176 of the delay valve 17 to the passage 132 leading to the chamber 42 at the face of the piston 40 of the application portion 8.

Fluid under pressure supplied to the passage 44 from the passage 224 flows therethrough in the opposite direction through the choke 46 to the chamber 42 at the face of the piston 40 of the application portion 8, while fluid under pressure will also flow from the passage 44 through the passage 156 to the chamber 154 of the release valve 10. At this time the valve 152 is in the seated position so as to prevent the release of fluid from the chamber 154.

On an increase in the pressure of the fluid in the chamber 42 at the face of the piston 40 of the application portion 8, the piston 40 moves to the right, as viewed in Fig. 1 of the drawings, and after a predetermined amount of movement thereof the stem 52 moves the slide valve 50 to a position to cut off communication between the valve chamber 48 and the atmosphere through the ports 54. On further movement of the piston 40 to the right the end of the stem 52 engages the face of the valve piston 56 and moves it against the spring 68 so that the sealing gasket 60 carried thereby is moved away from the seat rib 62, thereby permitting fluid under pressure supplied from the main reservoir 4 by way of the pipe and passage 66 to the chamber 64 to flow past the seat rib 62 to the valve chamber 48, from which it flows by way of the passage and pipe 49 to the brake cylinder 2.

After a time interval the automatic portion of the engineer's brake valve device, not shown, is turned from the application position to the lap position to cut off the release of fluid from the brake pipe.

Fluid under pressure will continue to flow from the valve chamber 22 and the pressure chamber 14 to the application chamber 15 and to the chamber 42 at the face of the piston 40 until the pressure of the fluid in the valve chamber 22 and in the pressure chamber 14 is reduced substantially to or slightly below the pressure at which the brake pipe has been reduced. The piston 20 will thereupon be moved to the left a short distance to the lap position, and on this movement of the piston 20 the auxiliary slide valve 38 is moved relative to the main slide valve 36 to a position in which the port 238 therethrough no longer establishes communication with the port 240 through the main slide valve 36, so that the flow of fluid under pressure from the valve chamber 22 and the pressure chamber 14 to the application chamber 15 and to the chamber 42 at the face of the piston 40 of the application portion 8 is cut off.

The application portion 8 will continue to supply fluid under pressure to the brake cylinder 2 until the pressure of the fluid in the brake cylinder and in the valve chamber 48 has increased substantially to or slightly above the pressure of the fluid supplied to the chamber 42 at the opposite face of the piston 40, whereupon the piston 40 will be moved to the left, as viewed in Fig. 1 of the drawings, so as to permit the valve piston 56 to be moved by the spring 68 to the seated position to cut off the further supply of fluid under pressure from the chamber 64 to the valve chamber 48 and thence to the brake cylinder 2.

As the piston 76 of the reduction chamber cut-off valve device 9 is not subject to force exerted by the spring 126 at this time there is no possibility that during an application of the brakes this piston will move from its application position, which is the position in which it is shown in Fig. 3 of the drawings, which would result in an undesired interference with the operation of the brakes on the locomotive.

In order to release the brakes the automatic portion of the engineer's brake valve, not shown, is turned from the lap position to the release position to supply fluid under pressure from the main reservoir 4 to the brake pipe 1, and after it has been in this position for a short time, it is turned to the running position in which fluid under pressure is supplied from the main reservoir to the brake pipe 1 by a feed valve device, not shown, at the pressure of the fluid carried in the brake pipe.

On an increase in the pressure of the fluid in the brake pipe 1 there is an increase in the pressure of the fluid in the chamber 26 at the face of the piston 20 of the equalizing portion 7 of the distributing valve device 5, and this piston is moved to the left from the position in which it is shown in Fig. 3 of the drawings to the position in which it is shown in Fig. 1 of the drawings, thereby opening communication through the feed groove 206 so that fluid under pressure may flow from the chamber 26 through the feed groove 206 to the valve chamber 22 and therefrom by way of the passage 24 to the pressure chamber 14 to charge these chambers with fluid under pressure at the pressure carried in the brake pipe.

On this movement of the piston 20 the main slide valve 36 is moved from its application position, which is the position in which it is shown in Fig. 3 of the drawings, to the release position, which is the position in which it is shown in Fig. 1 of the drawings.

When the main slide valve 36 is in the release position a port 262 therein communicates with the passage 252, which at this time communicates with the port 256 through the slide valve 82 with the valve chamber 84, so that fluid under pressure may flow from the valve chamber 84 through the port 262 in the main slide valve 36 to the port 240 therein, and through the cavity 230 in the auxiliary slide valve 38 to a port 232 in the main slide valve 36.

In this position of the main slide valve 36 the port 232 therein communicates with the passage 246, and through this passage with the cavity 236 in the face of the main slide valve 36, which at this time communicates with a passage 264 leading to the passage 226 which communicates through the choke 228 with the application passage and pipe 146, which in the running position of the automatic portion of the engineer's brake valve device is connected to atmosphere.

As a result, therefore, fluid under pressure present in the valve chamber 84 is released to the atmosphere through the application passage and pipe 146.

In addition, when the main slide valve 36 of the equalizing portion 7 is moved to the release position the cavity 212 therein no longer establishes communication between the passage 250, leading from a port in the seat of the slide valve 82 of the reduction chamber cut-off valve device 9, and the passage 214, leading from the reduction chamber 16, but is in a position in which it establishes communication between the passage 214 and an atmospheric passage 216 so that the fluid under pressure in the reduction chamber 16 may escape to the atmosphere.

In addition, in this position of the main slide valve 36 the cavity 218 therein continues to establish communication between the passage 44, which communicates with the chamber 42 at the face of the piston 40 of the application portion 8, and the passage 220 leading to the application chamber 15.

On movement of the main slide valve 36 to the release position the cavity 242 therein is moved so that it no longer establishes communication between the passage 80, leading to the operating chamber 78, and the atmospheric passage 244, while the slide valve 36 uncovers the end of passage 80 so that fluid under pressure flows from the pressure chamber 14 and the valve chamber 22 to the passage 80 and therethrough to the operating chamber 78 to increase the pressure of the fluid in this chamber.

On an increase in the pressure of the fluid in the operating chamber 78 the force exerted by this fluid on the piston 76 exceeds the opposing force of the fluid in the valve chamber 84, which is being released at this time through the application passage and pipe 146, as pointed out above, with the result that the piston 76 is moved to the left, as viewed in the drawings, to its normal position in which the sealing gasket 88 carried thereby engages the seat rib 86 surrounding the valve chamber 84.

In addition, the fluid under pressure supplied to the operating chamber 78 exerts force on the piston 108 to hold the seat rib 118 thereon in engagement with the face of the gasket 120 so as to prevent unintended flow of fluid from the operating chamber 78 around the piston 108 to the control chamber 110.

On movement of the piston 76 to the normal position the slide valve 82 is moved to a position in which the cavity 208 therein no longer establishes communication with the passage 112, leading from the control chamber 110, and the atmospheric passage 260, and the cavity now establishes communication between the passage 112 and the passage 210 leading from the valve chamber 22 so that fluid under pressure flows from the valve chamber 22 to the control chamber 110 to charge this chamber with fluid under pressure at the pressure carried in the valve chamber 22.

As the piston 108 is now subject to the opposing pressures of the fluid in the chambers 78 and 110 on opposite sides thereof, and as these chambers are each charged with fluid under pressure at the pressure carried in the valve chamber 22, the piston 108 will remain in the position which it occupies, which is the position in which it is shown in Fig. 3 of the drawings.

In addition, on movement of the slide valve 82 to the release position, which is the position in which it is shown in Fig. 1 of the drawings, the port 256 therethrough is moved out of communication with the passage 252 and into communication with the passage 246 so that any fluid under pressure remaining in the valve chamber 84 may flow through the port 256 to the passage 246, and thence through the cavity 236 in the main slide valve 36 of the equalizing portion 7 to the passage 264, and to the passage 226 from which it flows through the choke 228 to the application passage and pipe 146 and therefrom to the atmosphere.

In addition, on movement of the slide valve 82 to the release position the cavity 222 therein no longer establishes communication between the passages 246 and 224, but is in a position to establish communication between the passage 224 and the passage 226 so that fluid under pressure from the application chamber 15 may flow therefrom through the passage 220, through the cavity 218 in the face of the main slide valve 36 to the passage 44, and thence to the passage 224, through the cavity 222, the passage 226, and through the choke 228 to the application passage and pipe 146 through which it flows to the atmosphere.

In addition, fluid under pressure from the chamber 42 at the face of the piston 40 of the application portion 8 flows therefrom through the passage 44 to the passage 224, through the cavity 222 to the passage 226, and through the choke 228 to the application passage and pipe 146 from which it is released to the atmosphere through the automatic portion of the engineer's brake valve device as explained above.

On the release of fluid under pressure from the chamber 42 at the face of the piston 40 the higher pressure of the fluid in the valve chamber 48 moves the piston 40 to the left, as viewed in Fig. 1 of the drawings, and on this movement of the piston 40 the stem 52 moves the slide valve 50 upon its seat so as to open communication from the valve chamber 48 through the ports 54 to release fluid under pressure from the brake cylinder 2 by way of the pipe and passage 49, the valve chamber 48 and the atmospheric passages 54.

It will be seen that this brake equipment has a reduction chamber to which fluid under pressure is supplied from the pressure chamber on an application of the brakes, together with valve means operative on a predetermined increase in the pressure of the fluid in this chamber to cut off the supply of fluid to this chamber. It will be seen also that this valve means employs a spring to oppose movement thereof to the position to cut off the supply of fluid to the reduction chamber, and that this spring is rendered ineffective to exert force on this valve means on movement of the valve means to a position to cut off the supply of fluid to the reduction chamber. As a result, therefore, there is no possibility of unintended movement of the reduction chamber cut-off valve means during an application of the brakes.

It will be seen also that on a release of the brakes, and on a subsequent application thereof, the spring is again rendered effective to exert force on the valve means until this valve means operates to again cut off the supply of fluid to the reduction chamber.

While one embodiment of the improved locomotive brake equipment provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake, in combination, valve means operable to supply fluid under pressure to effect an application of the brakes, a yielding resistance means, a reduction reservoir, a valve device subject to the opposing pressures of said yielding resistance means and of the reduction reservoir and operative upon a predetermined increase in fluid pressure in the reduction reservoir to move to its application position to establish communication through which said valve means supplies fluid under pressure to effect an application of the brakes, and means operable upon movement of said valve device towards the application position for rendering said yielding resistance means ineffective to oppose movement of said valve device.

2. In a fluid pressure brake, in combination, a brake pipe, a pressure chamber, a reduction chamber, a yielding resistance means, valve means subject to the opposing pressures of the fluid in the brake pipe and of the fluid in the pressure chamber for supplying fluid from the pressure chamber to the reduction chamber and to also supply fluid from the pressure chamber to effect an application of the brakes, a valve device subject to the opposing pressures of the fluid in the reduction chamber and of said yielding resistance means and operative upon a predetermined increase in fluid pressure in the reduction chamber to move to an application position to establish communication through which said valve means supplies fluid to effect an application of the brakes, and means operable upon movement of said valve device towards the application position for rendering said yielding resistance means ineffective to oppose movement of said valve device.

3. In a fluid pressure brake, in combination, a brake pipe, a pressure chamber, a reduction chamber, a yielding resistance means, valve means subject to the opposing pressures of the fluid in the brake pipe and of the fluid in the pressure chamber for supplying fluid from the pressure chamber to the reduction chamber and to also supply fluid from the pressure chamber to effect an application of the brakes, a valve device subject to the opposing pressures of the fluid in the reduction chamber and of said yielding resistance means and operative upon a predetermined increase in fluid pressure in the reduction chamber to move to an application position to establish communication through which said valve means supplies fluid to effect an application of the brakes and to cut off the supply of fluid to the reduction chamber, and means operable upon movement of said valve device towards the application position for rendering said yielding resistance means ineffective to oppose movement of said valve device.

4. In a fluid pressure brake, in combination, a brake pipe, a pressure chamber, a reduction chamber, a valve chamber, yielding resistance means, valve means subject to the opposing pressures of the fluid in the brake pipe and of the fluid in the pressure chamber for supplying fluid under pressure from the pressure chamber to said valve chamber and for also supplying fluid from the pressure chamber to effect an application of the brakes, a valve device subject to the opposing pressures of the fluid in said valve chamber and of said yielding resistance means and operative on a predetermined increase in the pressure of the fluid in the pressure chamber to move to an application position to cut off the flow of fluid from said valve chamber to said reduction chamber, and to establish a communication through which said valve means supplies fluid to effect an application of the brakes, and means operable upon movement of said valve device towards said application position for rendering said yielding resistance means ineffective to oppose movement of said valve device.

5. In a fluid pressure brake, in combination, valve means operable to supply fluid under pressure to effect an application of the brakes, an operating chamber, a control chamber, a movable abutment subject to the opposing pressures of said chambers, yielding resistance means associated with said abutment, a reduction reservoir, a valve device subject to the opposing pressures of the fluid in the reduction reservoir and of said yielding resistance means and operative on a predetermined increase in fluid pressure in the reduction reservoir to cut off the supply of fluid to the control chamber, to release fluid from said control chamber, and to establish communication through which said valve means supplies fluid under pressure to effect an application of the brakes, and means controlled by said valve means for supplying fluid under pressure to and for releasing fluid under pressure from said operating chamber.

6. In a fluid pressure brake, in combination, valve means operable to supply fluid under pressure to effect an application of the brakes, a reduction reservoir, a valve device movable on an increase in the pressure of the fluid in the reduction reservoir to an application position to establish communication through which said valve means supplies fluid under pressure to effect an application of the brakes, yielding resistance means, a movable abutment associated with said resistance means and operative on an increase in the pressure of the fluid in a control chamber to condition the resistance means to oppose movement of the valve device to the application position, and means operable on movement of the valve device towards the application position for releasing fluid from said control chamber.

7. In a fluid pressure brake, in combination, a brake pipe, application means operative on an increase in fluid pressure to effect an application of the brakes, a pressure chamber, a reduction chamber, valve means subject to the opposing pressures of the fluid in the brake pipe and of the fluid in the pressure chamber for supplying fluid from the pressure chamber to a communication through which fluid may be supplied to the reduction chamber and to a communication through which fluid may be supplied to the application means, a valve device operated on a predetermined increase in the pressure of the fluid supplied to the reduction chamber to move from a normal position to an application position to cut off the supply of fluid to the reduction chamber and to establish a communication through which fluid may be supplied by said valve means to the application means, yielding resistance means opposing movement of the valve device from the normal position towards the application position, and means controlled by said valve device and operative on movement of said valve device away from the normal position to render said yielding resistance means ineffective to oppose movement of said valve device.

8. In a fluid pressure brake equipment, in combination, a pressure chamber, a reduction chamber, a brake pipe, application means operative on an increase in fluid pressure to effect an application of the brakes, valve means subject to the opposing pressures of the fluid in the pressure chamber and of the fluid in the brake pipe for supplying fluid under pressure from the pressure chamber to a passage through which fluid under pressure may be supplied to the reduction chamber and to a passage through which fluid may be supplied to the application means, a movable abutment subject to the opposing pressures of the fluid in an operating chamber and of the fluid in a control chamber, said abutment being movable between spaced positions, a valve device operated on an increase in the pressure of the fluid supplied to the reduction chamber to move to a position to cut off the supply of fluid to said reduction chamber, to release fluid from the control chamber, and to permit the supply of fluid to the application means by said valve means, yielding resistance means associated with said abutment and operative in one position of the abutment to oppose movement of said valve device, means controlled by said valve means for supplying fluid to and releasing fluid from said operating chamber, and means controlled by said valve device for supplying fluid to said control chamber.

9. In a fluid pressure brake equipment, in combination, a pressure chamber, a reduction chamber, a brake pipe, application means operative on an increase in fluid pressure to effect an application of the brakes, an operating chamber, a control chamber, a movable abutment subject to the opposing pressures of the fluid in said operating chamber and in said control chamber, yielding resistance means carried by said abutment, valve means subject to the opposing pressures of the fluid in the pressure chamber and of the fluid in the brake pipe for supplying fluid under pressure from the pressure chamber to a passage through which fluid may be supplied to the reduction chamber, and to a passage through which fluid may be supplied to the application means, and for controlling the supply of fluid under pressure to and the release of fluid under pressure from said operating chamber, and a valve device movable against said yielding resistance means on a predetermined increase in the pressure of the fluid supplied to the reduction chamber to a position to cut off the supply of fluid by said valve means to the reduction chamber and to permit the supply of fluid by said valve means to the application means, said valve device also controlling the supply of fluid under pressure to and the release of fluid under pressure from said control chamber 10. In a fluid pressure brake equipment, in combination, a pressure chamber, a reduction chamber, a brake pipe, application means operative on an increase in fluid pressure to effect an application of the brakes, an operating chamber, a control chamber, a movable abutment subject to the opposing pressures of the fluid in said operating chamber and in said control chamber, yielding resistance means carried by said abutment, valve means subject to the opposing pressures of the fluid in the pressure chamber and of the fluid in the brake pipe for supplying fluid under pressure from the pressure chamber to a passage through which fluid may be supplied to the reduction chamber, and to a passage through which fluid may be supplied to the application means and for controlling the supply of fluid under pressure to and the release of fluid under pressure from said operating chamber, and a valve device movable against said yielding resistance means on a predetermined increase in the pressure of the fluid supplied to the reduction chamber to a position to cut off the supply of fluid by said valve means to the reduction chamber, and to permit the supply of fluid by said valve means to the application means, said valve device also controlling the supply of fluid under pressure from the pressure chamber to and the release of fluid under pressure from said control chamber.

11. In a fluid pressure brake equipment, in combination, a pressure chamber, a reduction chamber, a brake pipe, application means operative on an increase in fluid pressure to effect an application of the brakes, a valve device operative on an increase in the pressure of the fluid in a valve chamber to move to a given position to cut off communication between said valve chamber and the reduction chamber and to establish communication between a supply passage and the application means, valve means subject to the opposing pressures of the fluid in the pressure chamber and of the fluid in the brake pipe for supplying fluid under pressure from the pressure chamber to said valve chamber and to said supply passage, a movable abutment subject to the opposing pressures of the fluid in an operating chamber and of the fluid in a control chamber, the abutment being movable between spaced positions, yielding resistance means carried by said abutment and operative in one position of said abutment to oppose movement of said valve device to said given position, means controlled by said valve device for supplying fluid under pressure to and for releasing fluid under pressure from said control chamber, and means controlled by said valve means for supplying fluid under pressure to and for releasing fluid under pressure from said operating chamber.

12. In a fluid pressure brake equipment, in combination, a pressure chamber, a reduction chamber, a brake pipe, application means operative on an increase in fluid pressure to effect an application of the brakes, a valve device operative on an increase in the pressure of the fluid in a valve chamber to move to a given position to cut off communication between said valve chamber and the reduction chamber and to establish communication between a supply passage and the application means, valve means subject to the opposing pressures of the fluid in the pressure chamber and of the fluid in the brake pipe for supplying fluid under pressure from the pressure chamber to said valve chamber and to said supply passage, a movable abutment subject to the opposing pressures of the fluid in an operating chamber and of the fluid in a control chamber, the abutment being movable between spaced positions, yielding resistance means carried by said abutment and operative in one position of said abutment to oppose movement of said valve device to said given position, means controlled by said valve device for supplying fluid under pressure from said pressure chamber to and for releasing fluid under pressure from said control chamber, and means controlled by said valve means for supplying fluid under pressure to and for releasing fluid under pressure from said operating chamber.

13. In a fluid pressure brake equipment, in combination, a pressure chamber, a reduction chamber, a brake pipe, application means operative on an increase in fluid pressure to effect an application of the brakes, a valve device operative on an increase in the pressure of the fluid in a valve chamber to move to a given position to cut off communication between said valve chamber and the reduction chamber and to establish communication between a supply passage and the application means, valve means subject to the opposing pressures of the fluid in the pressure chamber and of the fluid in the brake pipe for supplying fluid under pressure from the pressure chamber to said valve chamber and to said supply passage, a movable abutment subject to the opposing pressures of the fluid in an operating chamber and of the fluid in a control chamber, the abutment being movable between spaced positions, yielding resistance means carried by said abutment and operative in one position of said abutment to oppose movement of said valve device to said given position, means controlled by said valve device for supplying fluid under pressure to and for releasing fluid under pressure from said control chamber, and means controlled by said valve means for supplying fluid under pressure from the pressure chamber to and for releasing fluid under pressure from said operating chamber.

14. In a fluid pressure brake equipment, in combination, a pressure chamber, a reduction chamber, a brake pipe, application means operative on an increase in fluid pressure to effect an application of the brakes, a valve device operative on an increase in the pressure of the fluid in a valve chamber to move to a given position to cut off communication between said valve chamber and the reduction chamber and to establish communication between a supply passage and the application means, valve means subject to the opposing pressures of the fluid in the pressure chamber and of the fluid in the brake pipe for supplying fluid under pressure from the pressure chamber to said valve chamber and to said supply passage, a movable abutment subject to the opposing pressures of the fluid in an operating chamber and of the fluid in a control chamber, the abutment being movable between spaced positions, yielding resistance means carried by said abutment and operative in one position of said abutment to oppose movement of said valve device to said given position, means controlled by said valve device for supplying fluid under pressure from said pressure chamber to and for releasing fluid under pressure from said control chamber, and means controlled by said valve means for supplying fluid under pressure from the pressure chamber to and for releasing fluid under pressure from said operating chamber.

15. In a fluid pressure brake equipment, in combination, a pressure chamber, a reduction chamber, a brake pipe application means operative on an increase in fluid pressure to effect an application of the brakes, a movable abutment subject to the opposing pressures of the fluid in a control chamber and of the fluid in an operating chamber, said abutment being moved to an operating position on an increase in the pressure of the fluid in the control chamber to a value above the pressure in the operating chamber and being movable from said operating position on the release of fluid from the control chamber, a valve device operative on a predetermined increase in the pressure of the fluid in a valve chamber to move from a normal position to an application position, said valve device being operative in the normal position to establish communication between said valve chamber and said reduction chamber, to supply fluid from the pressure chamber to the control chamber, and to cut off communication between the supply passage and the application means, and being operative in its application position to cut off the supply of fluid from the valve chamber to the reduction chamber, to release fluid from the control chamber and to establish communication between the supply passage and the application means, yielding resistance means carried by said movable abutment and operative in the operating position of the abutment to oppose movement of the valve device from its normal position to its application position, and valve means subject to the opposing pressures of the fluid in the brake pipe and of the fluid in the pressure chamber for controlling the supply of fluid from the pressure chamber to said valve chamber and to said supply passage, and for also controlling the supply and release of fluid under pressure to and from said operating chamber.

JOHN N. GOOD.